Dec. 4, 1951 W. L. BURKHART 2,576,920

LIGHTING EQUIPMENT

Filed Jan. 21, 1948 2 SHEETS—SHEET 1

*INVENTOR.*
WILLIAM L. BURKHART
*BY* Geo. B. Pitts
*ATTORNEY.*

INVENTOR.
WILLIAM L. BURKHART
BY
Geo. B. Pitts
ATTORNEY.

Patented Dec. 4, 1951 2,576,920

UNITED STATES PATENT OFFICE 2,576,920

LIGHTING EQUIPMENT

William L. Burkhart, Long Beach, Calif.

Application January 21, 1948, Serial No. 3,470

7 Claims. (Cl. 40—132)

This invention relates to a lighting equipment adapted to be mounted in close relation to a device, such as a book, writing pad or telephone dial, to project light rays thereon, whereby use, inspection or examination of the device is facilitated. The equipment is adapted for use where these devices are so located that adequate lighting equipment is not or cannot be provided.

The equipment, for exemplification purposes, is shown mounted on a standard dial type of telephone and constructed to simultaneously transmit or project light rays on the telephone dial and through a section of transparent or semi-transparent material carrying certain data, information or advertisement for the user to observe.

One object of the invention is to provide an improved lighting equipment having a light source and adapted to direct light rays from the source on a device to be used or examined and simultaneously diffuse or transmit other light rays through walls of the equipment, whereby indicia associated therewith may be observed.

Another object of the invention is to provide an improved lighting equipment consisting of a casing enclosing a source of light, the wall being formed with a window to permit passage therethrough of light rays to light a device to be used or examined and a portion of the casing wall being formed of light transmitting material, whereby indicia or legends associated with this wall portion may be observed.

Another object of the invention is to provide an improved lighting equipment consisting of a casing having supporting elements for removably engaging a support and containing a light bulb and current supply therefor, a portion of the casing wall being formed of transparent or light transmitting material, whereby indicia or a legend on the transparent material may be observed.

A further object of the invention consists in the provision of certain improvements in the form of construction shown in Letters Patent No. 2,259,148 granted to me on October 14, 1941.

Other objects of the invention will be apparent to those skilled in the art to which my invention relates from the following description taken in connection with the accompanying drawings, wherein Fig. 1 is a front elevation of a telephone and a lighting equipment embodying my invention.

Figures 3, 4, 5, 6:
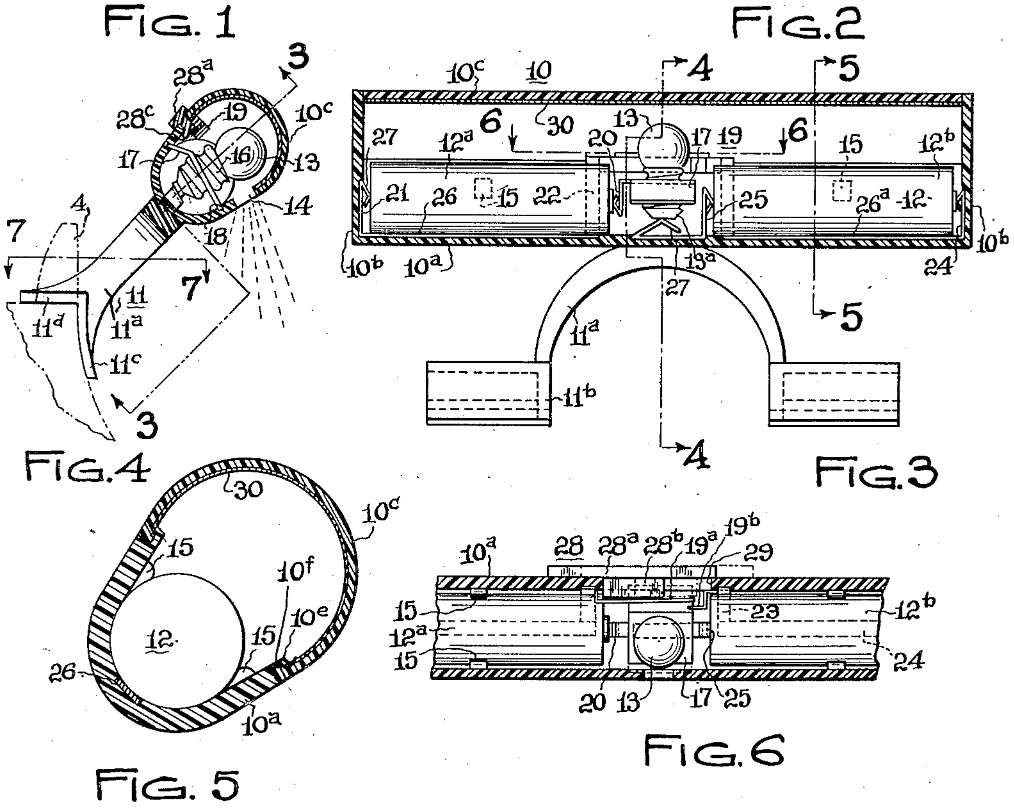
Fig. 3 is a view, partly in section, on the line 3—3 of Fig. 4.

Figs. 4 and 5 are sections on the line 4—4 and 5—5, respectively, of Fig. 3.

Fig. 6 is a fragmentary sectional view.

Figure 7:
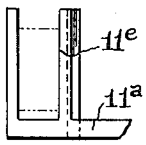

Fig. 7 is a fragmentary plan view on the line 7—7 of Fig. 4.

Figures 8, 9, 10:
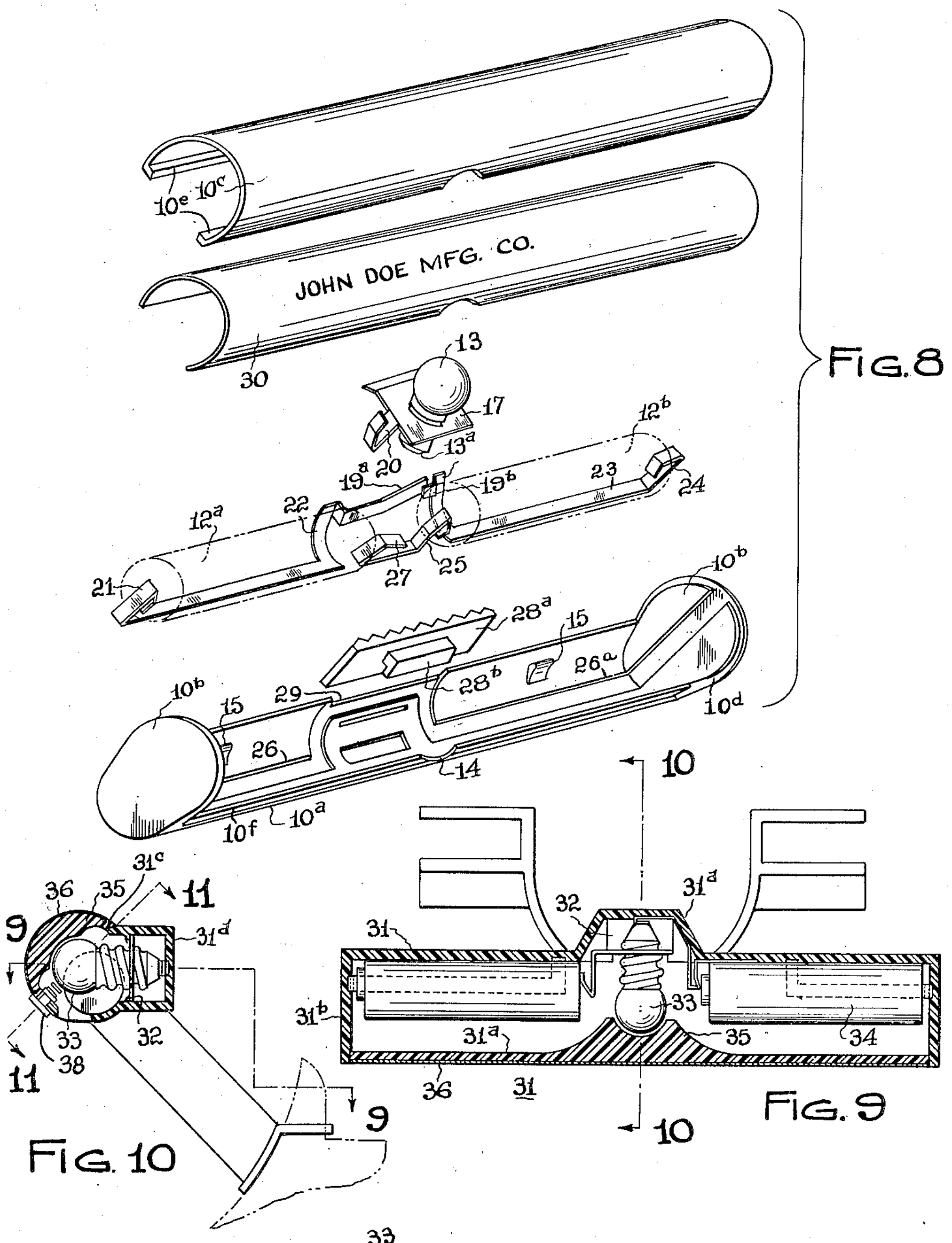

Fig. 8 is an exploded view showing the various parts in perspective.

Fig. 9 is a section on the line 9—9 of Fig. 10 showing a different embodiment of the invention.

Fig. 10 is a section on the line 10—10 of Fig. 9.

Figure 11:
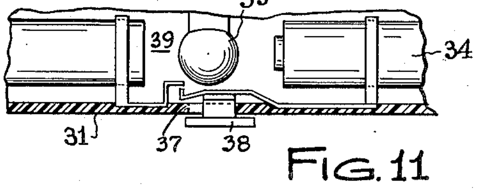

Fig. 11 is a section on the line 11—11 of Fig. 10.

In the drawings, 1 indicates as an entirety a telephone comprising a base 2 having an upwardly projecting body portion 3 provided with front and rear pairs of spaced arms 4, 4'.

Figure 1:
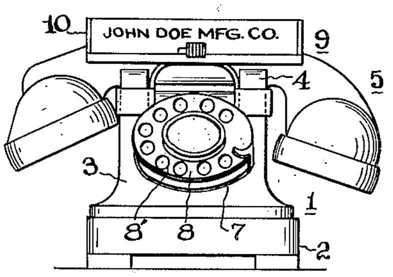
Figure 2:
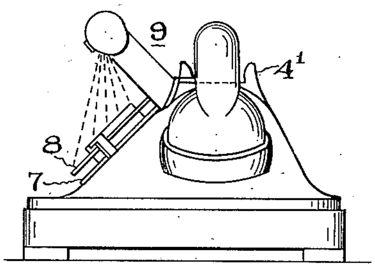
Fig. 2 is a side elevation.

The arms 4, 4', form a cradle for the central portion of a receiver and transmitter indicated as an entirety at 5, the weight of which when positioned as shown in Figs. 1 and 2, depresses a pin or pair of pins to disconnect the circuit from the receiver and transmitter 5. The front wall of the body portion 3 is inclined upwardly and supports a dial 7 which carries the indicating characters or groups of characters and a rotatable disk 8 spaced from the dial 7. The disk 8 is formed with openings 8' normally disposed in operative relation to the characters, respectively, which openings serve as the means to rotate the disk 8 in making a telephone call to another telephone.

9 indicates as an entirety a lighting equipment comprising an elongated casing 10 provided with attaching means 11 removably engaging the front pair of arms 4. The elongated casing is of a size to accommodate a battery 12 and a light bulb 13, the latter being preferably disposed midway the ends of the casing 10. The casing 10 consists of an inner or main section 10*a* of curvilinear cross section having end walls 10*b* and preferably integrally connected to the attaching means 11 and an outer section 10*c* of curvilinear shape in cross section detachably connected to the main section 10*a* and engaging the end walls 10*b* at its opposite ends. The curvilinear wall and end walls 10*b* forming the section 10*a* are opaque and preferably formed of a suitable plastic material. The outer section 10*c* is formed of a material which is transparent or semi-transparent and capable of transmitting or conducting light or light rays, such material consisting of methyl methacrylate resin, cellulose acetate or cellulose acetate butyrate, whereby the light rays emitted by the bulb 13 will be transmitted throughout the area of the section 10*c* and through its wall (due to its transparency) for a purpose later set forth. As shown, the sections 10a, 10c, provide a casing preferably of substantially oval shape in cross section, the major axis of which is disposed at substantially right angles to the plane of the dial 7 and supported by the attaching means 11 directly above and in overhanging relation to the dial 7 and disk 8. In this arrangement, the adjacent front marginal edges of the casing sections 10a, 10c, are cut away opposite the bulb 13 to form an opening or window 14, whereby the light rays illuminate the disk 8 and dial 7, as shown in Fig. 2. It will be observed (a) that the bottom, sides and end walls forming the section 10a are formed of opaque material and only the remaining wall portion of the casing 10 (that is, the section 10c) is formed of transparent, light transmitting material and (b) that the section 10c extends transversely throughout its length around and to the under side of the glass sphere of the bulb 13 to provide a maximum area of transparent material and to be in line with a maximum number of light rays.

The section 10c is removably connected to the section 10a to close the casing 10 as follows: the end walls 10b are cut away as shown at 10d (see Fig. 8) to form seats for the opposite ends of the section 10c, whereas the opposite longitudinal edges of the section 10c are shaped to provide inwardly extending shoulders 10e (see Figs. 5 and 8), which seat in grooves 10f formed in and extending longitudinally of the section 10a adjacent to but inwardly of its opposite side edges. As the section 10c is slightly resilient, its side portions may be relatively expanded to assemble it in position, or detach it from the section 10a to get access to the parts in the latter.

The battery 12 preferably consists of two dry cells 12a, 12b, seated in the main casing section 10a in axial relation at opposite sides of the bulb 13. As shown in Figs. 4 and 5, the inner wall of the section 10a is of arcuate shape, having a radius substantially equal to that of the exterior walls of the battery cells 12. Each cell 12a, 12b, is detachably secured in its seat by retaining elements 15 integrally formed on the inner wall of the section 10a and engaging the opposite outer side portions of the adjacent cell 12. When positioning a cell in its seat, it is pressed inwardly past the elements 15, the side portions of the section 10a being capable of yielding or expanding—due to the resiliency thereof—to permit the cell to be bodily moved into seating position or removed therefrom.

The base of the bulb 13 is threaded into a socket 16 extending through and suitably secured to the walls of an opening formed in a metal plate 17 formed of slightly resilient current conducting material, such as copper. The opposite side edges of the plate 17 fit into elongated recesses 18 formed in the inner wall of the section 10a. The plate 17 has a width slightly greater than that of the space between those opposed portions of the inner wall in which the recesses 18 are formed, whereby the walls of the recesses form seats for the plate edges to support it. The resiliency of the wall of the section 10a permitting its side portions to expand, provides for the positioning of the plate 17 in the section 10a or its removal therefrom.

The bulb 13 is supplied with current from the battery cells 12a, 12b, by leads, which form a circuit adapted to be closed by a switch 19, the leads being preferably formed of sections of flat, relatively thin resilient copper strips connected together and preferably arranged as follows (see Figs. 3, 6 and 8): lead section 20 is suitably fixed at one end to the plate 17 and engages the contact on the adjacent end wall of the cell 12a; section 21 engages the opposite end wall of the cell 12a and extends inwardly longitudinally of the casing section 10a to section 22, which extends around the adjacent battery cell and is connected to switch contact 19a normally disengaged from switch contact 19b; section 23 extends from switch contact 19b around the adjacent cell 12b to section 24, which extends outwardly longitudinally of the casing section 10a, its outer end engaging the contact on the outer end of cell 12b; and one end of section 25 engages the inner end of the cell 12b and its opposite end engages the contact or terminal 13a provided on the base of the bulb 13. The inner walls of the casing section 10a are formed with recesses 26, 26a, to receive the lead sections and each of the terminating ends of these lead sections, which engage the contacts and end walls of the cells 12a, 12b, is bent back on itself to provide a spring pressure terminal 27 for engagement with the adjacent contact surface. When the parts are assembled as shown in Fig. 3, the pressure exerted by the terminals 27 between the cells 12a, 12b, and inner walls of the casing section 10a serves to maintain the lead sections in their respective recesses 26, 26a. The switch contact 19a is operated into engagement with the contact 19b to close the circuit and light the bulb 13 by a button 28. The button 28 consists of a plate 28a provided on its inner face with an elongated wall 28b having along its lower edge a flange 28c spaced from the inner face of the plate 28a to form a guide slidably fitting the side edge of a cut-away 29 formed in the rear side portion of the section 10a. The end walls of the cut-away 29 serve to limit the travel of the button 28. The button 28 is shown in normal or circuit open position in Fig. 6; when the button 28 is moved to the right, as shown in dotted lines in Fig. 6, the wall 28b engages the switch contact 19a and swings it into engagement with the contact 19b to close the circuit and light the bulb. When the button 28 is moved to the left, the contact 19a—due to its resiliency—disengages the contact 19b to open the circuit. The plate 28a extends beyond the wall 28b on all sides thereof so as to close the opening formed by the cut-away 29 in either position of the button.

The attaching means 11 preferably consist of arms 11a extending outwardly from the casing section 10a preferably co-incidentally with the major axis of the casing 10 and terminating in lateral extensions 11b adapted to engage the front and top wall of body portion 3. Each extension 11b consists of a front depending wall 11c and a rearwardly extending horizontal wall 11d formed with an elongated opening 11e open at its outer end and adapted to fit over one of the arms 4, as shown in Figs. 1, 2 and 4. When the attaching means 11 are mounted as shown, the walls 11d rest on the top wall of the body portion 3 and the wall 11c engages the front wall thereof to support the casing 10 in position. The openings 11e are elongated and open at their outer ends so as to accommodate arms 4, 4, which may be differently spaced, or of different widths.

The transparent, light diffusing or transmitting wall provides a means of supporting or carrying certain information, such as telephone numbers, a slogan (A Merry Xmas and the like) or an advertisement as shown, which indicia may be clearly observed when the bulb 13 is lighted either in daytime or otherwise. The indicia may be permanently applied to the inner or outer surface of the section 10c, in which arrangement the letters or numbers constituting the indicia may be formed from an opaque material, but by preference I removably mount within the casing section 10c a sheet of transparent material 30 on which the desired indicia is written, typed, stamped or printed. The material 30 may be molded into a curvilinear shape to fit the inner or outer wall of the section 10c or consist of a section of material having a limited resiliency. The section of material, when applied to the inner wall of the section 10c, preferably has a width equal to that of the inner surface of the section 10c between the shoulders 10e thereon. As the opposite ends of the section 10c are open, when detached from the section 10a, it will be observed that the section of material may be readily slid or telescoped endwise of the section 10c into position or removed therefrom.

Referring to Figs. 9, 10 and 11, 31 indicates an elongated casing consisting of an inner or main section 31a having end walls 31b and outer section 31c formed of transparent, light diffusing material, such as herein referred to. The casing 31 is supported similarly to the casing 10. The casing section 31a is shaped to provide intermediate its ends a rearwardly extending off-set 31d the top and bottom walls of which support a plate 32 formed of conducting material, which plate in turn supports a light bulb 33. 34 indicates the battery cells at either side of the bulb 33. In this form of construction the wall of the section 31c adjacent to the bulb 33 is thickened, as shown at 35, the inner side of the wall portion 35 being of concave shape so as to fit over a large portion of the bulb surface. In this form of construction, the section of transparent material, indicated at 36, carrying the indicia to be observed is of curvilinear shape in cross section so as to removably fit the outer surface of the section 31c. The adjoining edges of the sections 31a, 31c, are cut away to form an opening 37 in which a push-button 38 is mounted and adapted to close the switch 39 when the bulb 33 is to be lighted.

It will be noted that my construction of lighting equipment is a self-contained unit and may, at will, be readily mounted in position and removed without the employment of tools or adjustment of a screw or unit; also, it is mounted in the area outwardly of the cradle for the receiver and transmitter and above the dialing member 8, so that removal and replacement of the receiver and transmitter and operation of the dial member are not interfered with.

To those skilled in the art to which my invention relates many changes in construction and widely different embodiments and applications of the invention will be apparent without departing from the spirit and scope of the invention. My disclosures and the description herein are purely illustrative and are not intended to be in any sense limiting.

What I claim is:

1. A lighting equipment adapted to be mounted on a support to illuminate a portion thereof and comprising an elongated casing consisting of an inner section formed of opaque material and provided with means for engaging the support and having bottom, side and end walls and an outer section of arcuate shape in cross section and formed of light-transmitting material, the opposite ends of said outer section being in seating relation to said end walls and the opposite longitudinal side edges of said outer section and the respective corresponding longitudinal side edges of the side walls of said inner section being provided with detachable, complementary interlocking unitary means to removably connect said sections together, electrical illuminating means within said casing and arranged to support a light bulb intermediate the ends of the latter, that side of said casing adjacent the portion of the support to be illuminated, intermediate the ends of said casing, being formed with a window through which light rays emitted by the bulb are projected, a light-modifying medium removably disposed within said casing between said outer section and the bulb, and manipulatable means on the remote side of said casing for controlling said illuminating means to light the bulb.

2. An equipment as claimed in claim 1 hereof wherein said support-engaging means consists of arms fixed to said inner section and extending laterally therefrom and terminating in support-engaging members each formed with an opening open at one end.

3. An equipment as claimed in claim 1 hereof wherein said light-modifying medium is mounted face-to-face upon the inner surface of said outer section.

4. A lighting equipment adapted to be mounted upon a support to illuminate a portion thereof and comprising an elongated casing consisting of an inner section formed of opaque resilient material and having a curvilinear bottom wall, diverging side walls and end walls and an outer section formed of transparent material of arcuate shape in cross section and removably engaged along its opposite side and end edges with the side edges of said side walls and said end walls, a light bulb, means for supporting said bulb in said inner section intermediate the ends thereof, battery cells in said inner section at opposite sides of said bulb, the inner surface of the bottom wall of said inner section at each side of said bulb having a radius equal to that of the adjacent cell to provide a seat therefor and said side walls being provided with transversely inwardly projecting elements arranged to engage the sides of the adjacent cells to secure them in their seats, an electrical circuit between said cells and said bulb, a switch in said circuit, that side of said casing adjacent the portion of the support to be illuminated being formed intermediate its ends with a window through which light rays emitted by said bulb are projected, a section of indicia-bearing transparent material mounted face-to-face upon one surface of said outer section, a device slidably supported on the opposed edges between said sections at that side of said casing remote from said window for operating said switch, and means on said inner casing section for detachably supporting it on the support.

5. A lighting equipment adapted to be mounted upon a support to illuminate a portion thereof and comprising an elongated casing consisting of an inner section formed of opaque material and provided with means for engaging the support and having bottom and side walls and end walls provided with arcuate terminating ends recessed on their inner faces adjacent the peripheral edges of said end walls to form seats and an outer section formed of transparent resilient material, the opposite ends of said outer section fitting within said seats and the opposite longitudinal side edges of said outer section and the respective corresponding longitudinal side edges of the side walls of said inner section being provided from end to end of said edges with detachable unitary means of interlocking connection so as to removably connect said sections together, electrical illuminating means within said casing and arranged to support a light bulb intermediate the ends of the latter, that side of said casing adjacent the portion of the support to be illuminated, intermediate the ends of said casing, being formed with a window through which light rays emitted by the bulb are projected, the marginal side edges of the outer section and side wall of the inner section remote from said window being cut away longitudinally of said edges, and manipulatable means on the bottom walls of said cutaways and arranged to control said illuminating means to light the bulb.

6. An equipment as claimed in claim 4 hereof wherein the electric circuit consists of leads formed of resilient conductor material portions of which engage the opposite ends of said cells to maintain them in position to supply current to the circuit.

7. A lighting equipment adapted to be mounted upon a support to illuminate a portion thereof and comprising an elongated casing of substantially egg-shape in transverse cross-section and consisting of an approximate one-half transverse section of opaque material along the smaller part thereof and an approximate one-half transverse section of transparent material along the larger part thereof, means for mounting said casing upon its support at an angle so as to have the transparent section at the upper part thereof, said sections having integrally formed means for removably connecting the same together, said casing having a window through the under side thereof approximately midway of the length thereof, means for mounting an electric light bulb socket within said casing at a point above said window so as to emit the light rays downwardly through the window and also outwardly through said transparent section, the smaller part of said casing having means for removably holding a battery cell along each side of said socket, an electric circuit and manually manipulatable switch for controlling the lighting of said bulb, and an indicia-bearing transparent medium removably mounted between said light bulb and transparent material, whereby there may be obtained simultaneously an illumination of the support below the light bulb and also a visible display through the upper part of said casing.

WILLIAM L. BURKHART.

REFERENCES CITED

The following references are of record in the file of this patent:

UNITED STATES PATENTS

| Number | Name | Date |
|---|---|---|
| 1,799,545 | Chase | Apr. 7, 1931 |
| 1,997,687 | Hoegger | Apr. 16, 1935 |
| 2,020,016 | Brusseau | Nov. 5, 1935 |
| 2,118,777 | Hammer | May 24, 1938 |
| 2,183,647 | Holden | Dec. 19, 1939 |
| 2,195,423 | Powell | Apr. 2, 1940 |
| 2,258,541 | Cressaty | Oct. 7, 1941 |
| 2,259,148 | Burkhart | Oct. 14, 1941 |
| 2,299,148 | Johnson | Oct. 20, 1942 |
| 2,347,665 | Christensen et al. | May 2, 1944 |